United States Patent
Wroblewski et al.

(10) Patent No.: US 10,698,298 B2
(45) Date of Patent: *Jun. 30, 2020

(54) CAMERA FRAME WITH SIDE DOOR

(71) Applicant: GoPro, Inc., San Mateo, CA (US)

(72) Inventors: Alexander Wroblewski, Santa Clara, CA (US); Kielan Crow, San Francisco, CA (US); Himay Rashmikant Shukla, San Mateo, CA (US); Ryan Harrison, Walpole, NH (US)

(73) Assignee: GoPro, Inc., San Mateo, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/827,978

(22) Filed: Nov. 30, 2017

(65) Prior Publication Data

US 2018/0095343 A1 Apr. 5, 2018

Related U.S. Application Data

(63) Continuation of application No. 15/395,506, filed on Dec. 30, 2016, now Pat. No. 9,864,257.

(60) Provisional application No. 62/396,729, filed on Sep. 19, 2016.

(51) Int. Cl.
*G03B 17/04* (2006.01)
*H04N 5/225* (2006.01)
*G03B 17/56* (2006.01)

(52) U.S. Cl.
CPC .............. *G03B 17/04* (2013.01); *G03B 17/56* (2013.01); *H04N 5/2252* (2013.01)

(58) Field of Classification Search
None
See application file for complete search history.

(56) References Cited

U.S. PATENT DOCUMENTS

| | | |
|---|---|---|
| 1,612,277 A | 12/1926 | Leo |
| 6,138,826 A | 10/2000 | Kanamori |
| 7,613,386 B2 | 11/2009 | Shimamura |
| 7,801,425 B2 | 9/2010 | Fantone |
| 8,013,932 B2 | 9/2011 | Chan |
| 8,014,656 B2 | 9/2011 | Woodman |
| 8,544,643 B2 | 10/2013 | Yim |
| D699,276 S | 2/2014 | Samuels |
| D699,277 S | 2/2014 | Samuels |
| 8,749,966 B1 | 6/2014 | Boudreau |

(Continued)

*Primary Examiner* — William B Perkey
(74) *Attorney, Agent, or Firm* — Young Basile Hanlon & MacFarlane, P.C.

(57) ABSTRACT

A camera housing includes four walls configured to enclose and secure a camera: a top wall, a bottom wall, a right wall, and a left wall. The bottom wall includes a first segment and a segment coupled by a latching mechanism. The latching mechanism comprises a tongue component coupled to the second segment and a groove component coupled to the first segment. The tongue and groove components are configured such that the tongue component securely couples the second segment to the first segment when the camera frame is in the closed configuration. In the open configuration, the first and second segment can decouple and the left wall and second segment rotates upwards relative to the top wall such that a camera can be inserted or removed from the camera system. The camera housing also includes a button interface, an input/output interface, and a mounting mechanism.

17 Claims, 12 Drawing Sheets

(56) References Cited

U.S. PATENT DOCUMENTS

| | | | |
|---|---|---|---|
| 8,837,928 B1* | 9/2014 | Clearman | E05B 17/2019 |
| | | | 396/25 |
| 8,917,496 B2 | 12/2014 | Richardson | |
| 9,014,766 B2 | 4/2015 | Hu | |
| 9,622,556 B2 | 4/2017 | Fathollahi | |
| 9,864,257 B1* | 1/2018 | Wroblewski | G03B 17/04 |
| 2006/0061663 A1 | 3/2006 | Park | |
| 2006/0274493 A1 | 12/2006 | Richardson | |
| 2007/0071423 A1 | 3/2007 | Fantone | |
| 2009/0032420 A1 | 2/2009 | Zenzai | |
| 2010/0060747 A1 | 3/2010 | Woodman | |
| 2012/0043236 A1 | 2/2012 | Szucs | |
| 2012/0195585 A1* | 8/2012 | Wagner | F16M 11/041 |
| | | | 396/428 |
| 2012/0262618 A1 | 10/2012 | Weakly | |
| 2013/0057758 A1 | 3/2013 | Woodman | |
| 2013/0184033 A1* | 7/2013 | Willenborg | H04M 1/04 |
| | | | 455/557 |
| 2013/0315577 A1 | 11/2013 | Clark | |
| 2014/0036420 A1 | 2/2014 | Chen | |
| 2014/0190841 A1 | 7/2014 | Nash | |
| 2014/0226268 A1 | 8/2014 | ONeill | |
| 2014/0353178 A1 | 12/2014 | Kim | |
| 2015/0136620 A1 | 5/2015 | Williams | |
| 2015/0195436 A1* | 7/2015 | Samuels | G03B 17/02 |
| | | | 348/220.1 |
| 2017/0050794 A1 | 2/2017 | Clark | |
| 2017/0142300 A1 | 5/2017 | Rice | |
| 2019/0258142 A1* | 8/2019 | Liu | H04N 5/232933 |

* cited by examiner

CAMERA FRAME WITH SIDE DOOR

CROSS REFERENCE TO RELATED APPLICATIONS

This application is a continuation of U.S. application Ser. No. 15/395,506, filed Dec. 30, 2016, now U.S. Pat. No. 9,864,257, which claims the benefit of U.S. Provisional Application No. 62/396,729, filed Sep. 19, 2016, which is incorporated by reference in its entirety.

TECHNICAL FIELD

This description generally relates to a camera frame and more specifically a removable camera frame with a latching sidewall.

DESCRIPTION OF THE RELATED ART

Digital cameras are becoming more prevalent in today's society and are being introduced into ever more challenging action environments. As such, the cameras are being incorporated into more camera systems which necessitate camera housings suitable for challenging action environments. Camera housings for cameras in action environments must ensure that the camera is securely held within the greater camera system such that the camera is able to operate at peak performance with high image and video quality. Furthermore, the camera housings should be configured such that the loading of the camera into the housing is not difficult for users of the action cameras. However, existing camera frames are large, clunky, and hard to use while generally imposing limitations or reductions on camera performance when the camera is used within the camera frame.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1A illustrates a planar view of a camera frame in a closed configuration, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Camera housing can include four walls: a left wall, a right wall, a top wall and a bottom wall. The bottom wall of the housing can include a first segment and a second segment, the first segment being coupled to the right wall and the second segment being coupled to the left wall. Each wall of the housing may have an inner surface and an outer surface with the inner surfaces of the housing configured to abut the surfaces of the camera. The walls of the camera may be coupled and shaped such that the camera housing is substantially rectangular.

The first segment of the bottom wall and the second segment of the bottom wall can be coupled by a latching mechanism such that when the two segments are coupled the camera housing encompasses and secures a camera within the frame in a closed configuration. The latching mechanism may include a tongue component coupled to the first segment and a groove component coupled to the second segment. The tongue and groove components may be configured with reciprocal platforms, ridges, or latches such that the tongue component can securely couple to the groove component. The latching mechanism may decouple the tongue component from the groove component via interaction with a compressible surface or feature.

The left wall and the side wall can couple via a hinge mechanism configured to rotate about a rotation axis such that the coupled left wall and second segment of the bottom wall rotate relative to the top side wall. The coupled left side wall and second segment of the bottom wall may rotate to an open configuration such that a camera can be inserted into the camera frame or removed from the camera frame. The hinge mechanism can be controlled by a spring mechanism which limits the amount of rotation or speed of rotation possible by the hinge mechanism.

The camera and housing may be configured such that the camera is further coupled to the camera housing by an input/output interface. The camera housing may also include a mounting mechanism for mounting the camera to broader camera systems. Additionally, the camera housing may be configured such that buttons on the camera may be used while within the camera housing via button interfaces configured into the camera housing.

Example Camera Frame Configuration

A camera frame may be designed with an open configuration and a closed configuration. In the closed configuration, the camera frame encloses and couples to a camera such that the camera is held in position within the frame during use of the camera system. In the open configuration, the camera frame is opened via a latching mechanism for the camera to be inserted or removed from the camera frame.

Figure 1A:
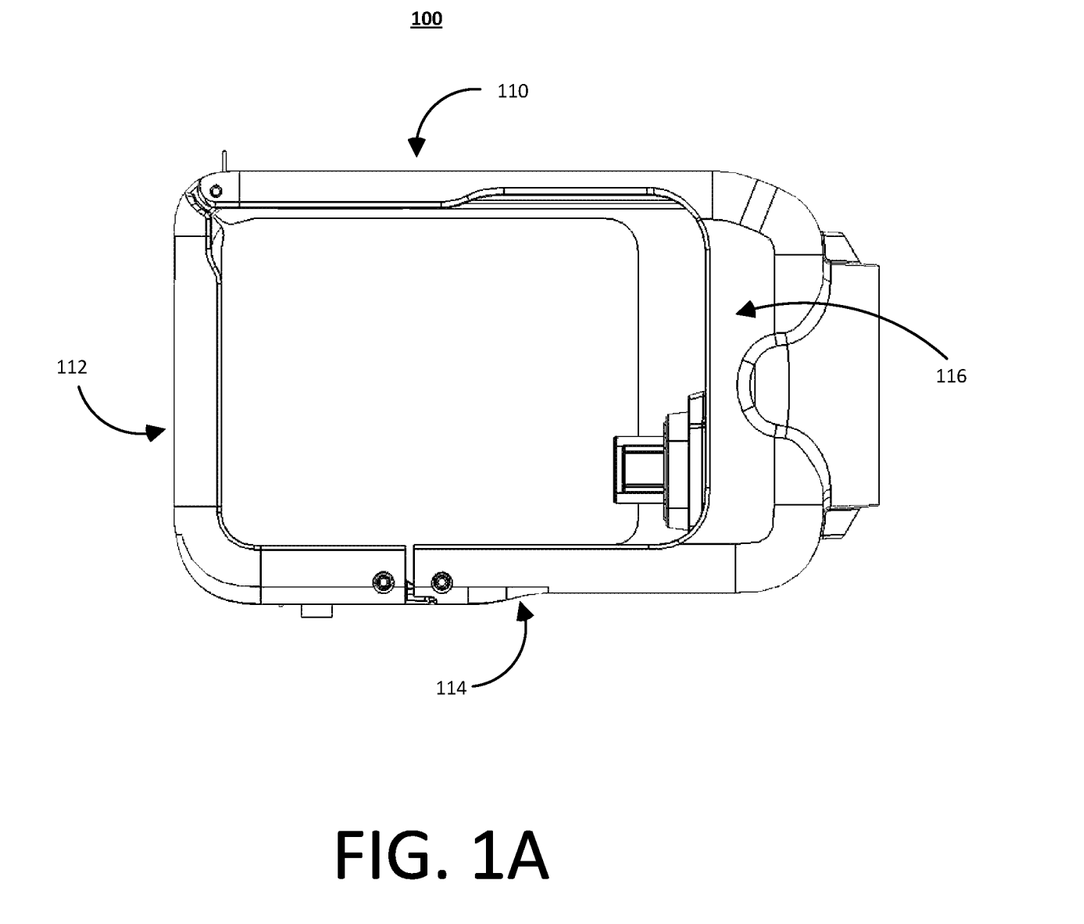

FIG. 1A illustrates a planar view of an example camera frame 100 in the closed configuration with four walls: a top wall 110, a left side wall 112, a bottom wall 114, and a right side wall 116, according to one embodiment. Each wall of the camera frame has an inner surface and an outer surface. Henceforth, reference will be made to the orientation of the camera or relative orientations of camera components in the orientation as illustrated in FIG. 1A, i.e. the 'top' or 'upwards' is towards the top of the page, the 'left' or 'left side' is towards the left of the page, the 'bottom' or 'downwards' is towards the bottom of the page, and the 'right' or 'right side' is towards the right of the page.

In the illustrated embodiment, the walls of the camera frame 100 can be coupled such that an edge of one wall is coupled to an edge of a second wall by a joint. In the illustrated embodiment, the top edge of the left side wall 112 is coupled to the left edge of the top wall 110; the right edge of the top wall 110 is coupled to the top edge of the right side wall 116; the bottom edge of the right side wall 116 is coupled to the right side of the bottom wall 114; and the left edge of the bottom wall 114 is coupled to the bottom edge of the left side wall 112. The walls can be coupled such the shape of the camera frame 100 is substantially rectangular. The joint formed when coupling two walls of the camera frame may be formed by a hinge, a latch, glue, or any other mechanism capable of joining two walls. In some embodiments, there may not be a physical joint as any combinations of walls are created from the same piece of material. In some configurations, the outer surfaces of the camera frame about the coupling joint between two camera walls may be substantially rounded.

Figure 1B:
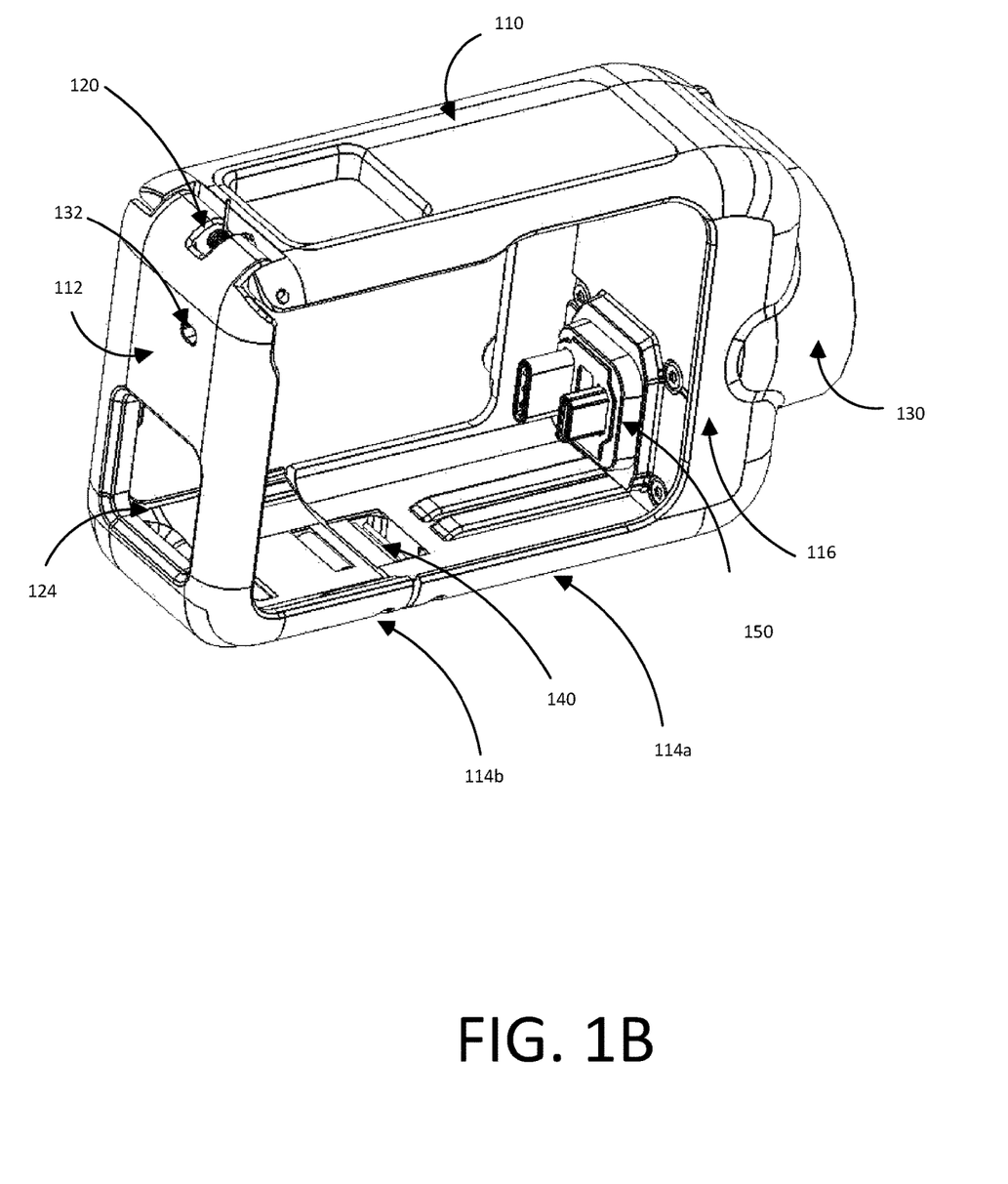
FIG. 1B illustrates an isometric view of the camera frame of FIG. 1A in a closed configuration, according to one embodiment.

The camera frame illustrated in FIG. 1B demonstrates an isometric view of the camera frame 100 in the closed configuration, according to one embodiment. In the illustrated embodiment, the top wall 110 is pivotally coupled to a left side wall 112 by a hinge mechanism 120. The left side wall 112 may include a microphone interface 132 configured to allow passage of sound from outside the camera frame to the audio systems of a camera when enclosed by the camera frame through the camera wall. The left side wall 112 may also include a button interface 124 that can enable a user to interact with a button on a camera when the camera is enclosed within the frame 100. The top wall 110 is coupled to a right side wall 116 that may include a mounting mechanism 130 for mounting the frame to a gimbal, a handle, an aerial vehicle, or any other suitable camera mounting device or mechanism. In the illustrated embodiment, the bottom wall 114 is divided into a first portion 114 and a second portion 114b. The right side wall 116 may couple to the first portion of a bottom wall 114a, and the left side wall may couple to a second portion of the bottom wall 114b. The first portion of the bottom wall 114a and the second portion of the bottom wall 114b can fixedly couple and uncouple using a latching mechanism 140. In some embodiments, the coupled second portion of the bottom wall and the left side wall may be considered one wall The camera frame can include an input/output interface 150 on an inside surface of a wall of the camera frame which enables a camera to communicatively couple to the frame via the I/O interface. In the illustrated embodiment, the I/O interface is on the inner surface of the right side wall 116. In some embodiments, the mounting mechanism 130 includes a second I/O interface communicatively coupled to the first I/O interface via a communication bus. In such embodiments, when a camera is enclosed within the camera frame, the camera can be communicatively coupled (and, for instance, controlled or configured by) a device coupled to the camera frame via the mounting mechanism. In some configurations the controlling and configuring device may be a phone, a tablet, a computer, an aerial vehicle, a handle, or any other suitable device.

Figure 1C:
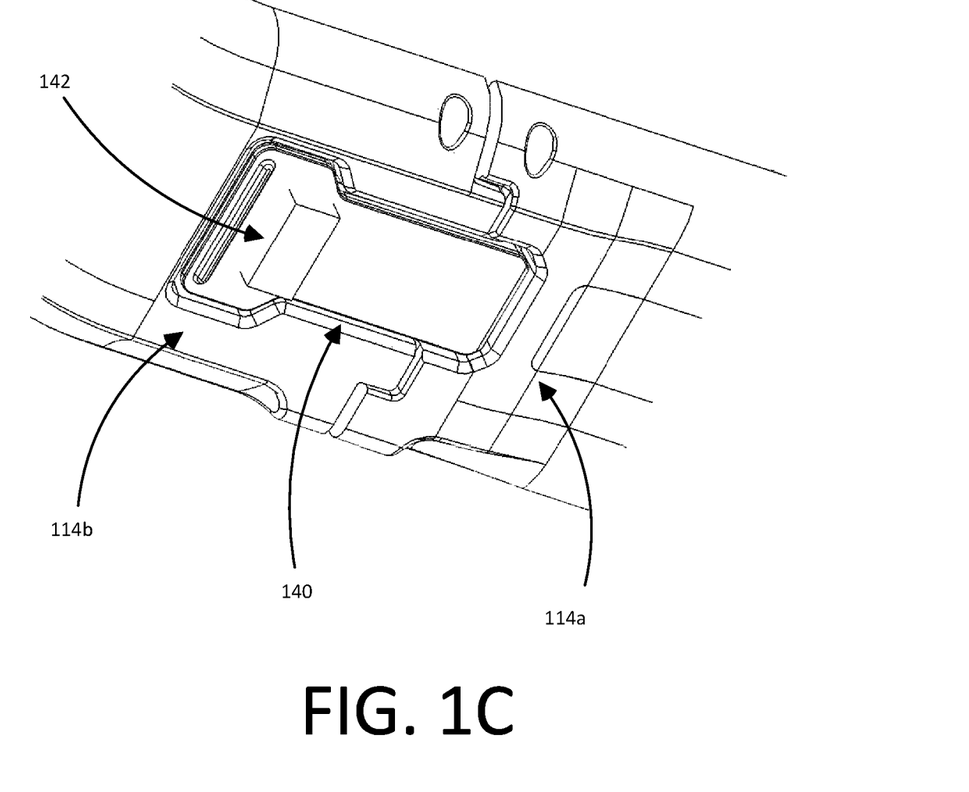
FIG. 1C illustrates a close-up view of the latching mechanism of the camera frame of FIGS. 1A and 1B in a closed configuration, according to one embodiment.

FIG. 1C illustrates a close-up view of the latching mechanism 140 of the camera frame 100 in the closed position, according to one embodiment. The latching mechanism 140 can be pivotally coupled to the second portion of the bottom wall, 114b and latches the first portion of the bottom wall 114a. When the camera frame is in the closed configuration, the latching mechanism 140 may secure the first portion of the bottom wall 114a to the second portion of the bottom wall 114b such that the first portion of the bottom wall couples to the second portion of the bottom wall. In some embodiments, the first portion of the bottom wall 114a and the second portion of the bottom wall 114b may form a smooth inner and/or outer surface of the camera frame 100 when the camera frame is in the closed configuration.

In some embodiments, the latching mechanism can include a compressible surface 142 that enables a user to latch and unlatch the second portion of the bottom wall 114b from the first portion of the bottom wall 114a when compressed (and thereby to toggle the configuration of the frame between the open configuration and the closed configuration). In other embodiments, the first portion of the bottom wall and the second portion of the bottom wall may couple via other attachment means, such as a button, a lever, Velcro, a lock mechanism, and the like.

Figure 1D:
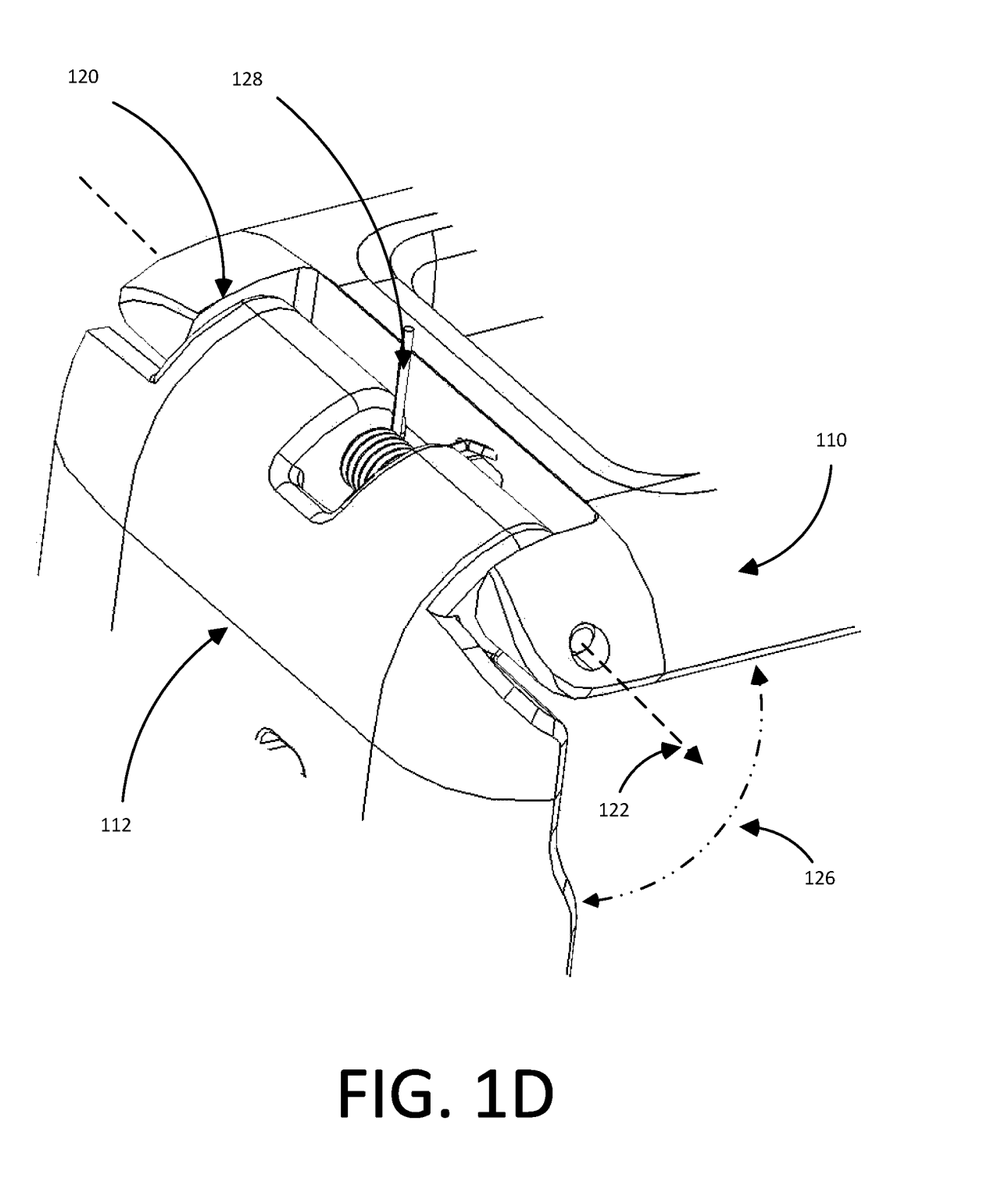
FIG. 1D illustrates a close-up view of the hinge mechanism of the camera frame of FIGS. 1A and 1B in a closed configuration, according to one embodiment.

FIG. 1D illustrates a close-up view of the hinge mechanism 120 of the camera frame 100, according to one embodiment. The hinge mechanism 120 can enable the left side wall 112 and the second portion of the bottom wall (not shown) to pivot and rotate around a rotation axis 122 of the hinge mechanism 120. The rotation axis 122 may be configured such that rotation of the left side wall 110 and second portion of the bottom wall is relative to the top wall of the camera frame, i.e. the rotation angle 126 between the top wall and the coupled left side wall and second portion of the bottom wall changes during pivots and rotations about the rotation axis 122. In some configurations the rotation of the hinge mechanism 120 is controlled by a hinge spring 128. In the illustrated embodiment, i.e. with the camera in a closed position, the rotation angle 126 is defined as 0 degrees and positive rotation angles 126 are counter clockwise rotations of the hinge mechanism 120 about the rotation axis 122 towards the top wall 110 of the camera frame.

Figure 2A:
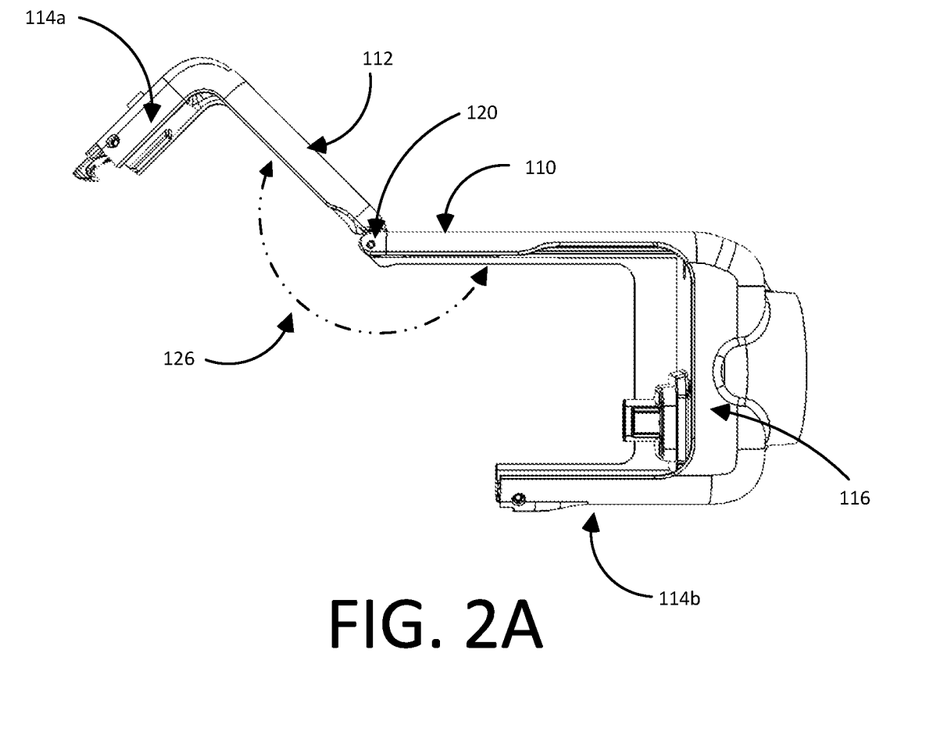
FIG. 2A illustrates a planar view of a camera frame in an open configuration, according to one embodiment.

FIG. 2A illustrates a planar view of the camera frame 100 in an open configuration, according to one embodiment. In the open configuration, the left side wall 112 and second portion of the bottom wall 114b have rotated about the rotation axis (out of the plane of FIG. 2A centered about the hinge mechanism 120) via the hinge mechanism 120, and the angle 124 is more than 90 degrees enabling the insertion of the camera into and removal of the camera from the frame 100.

Figure 2B:
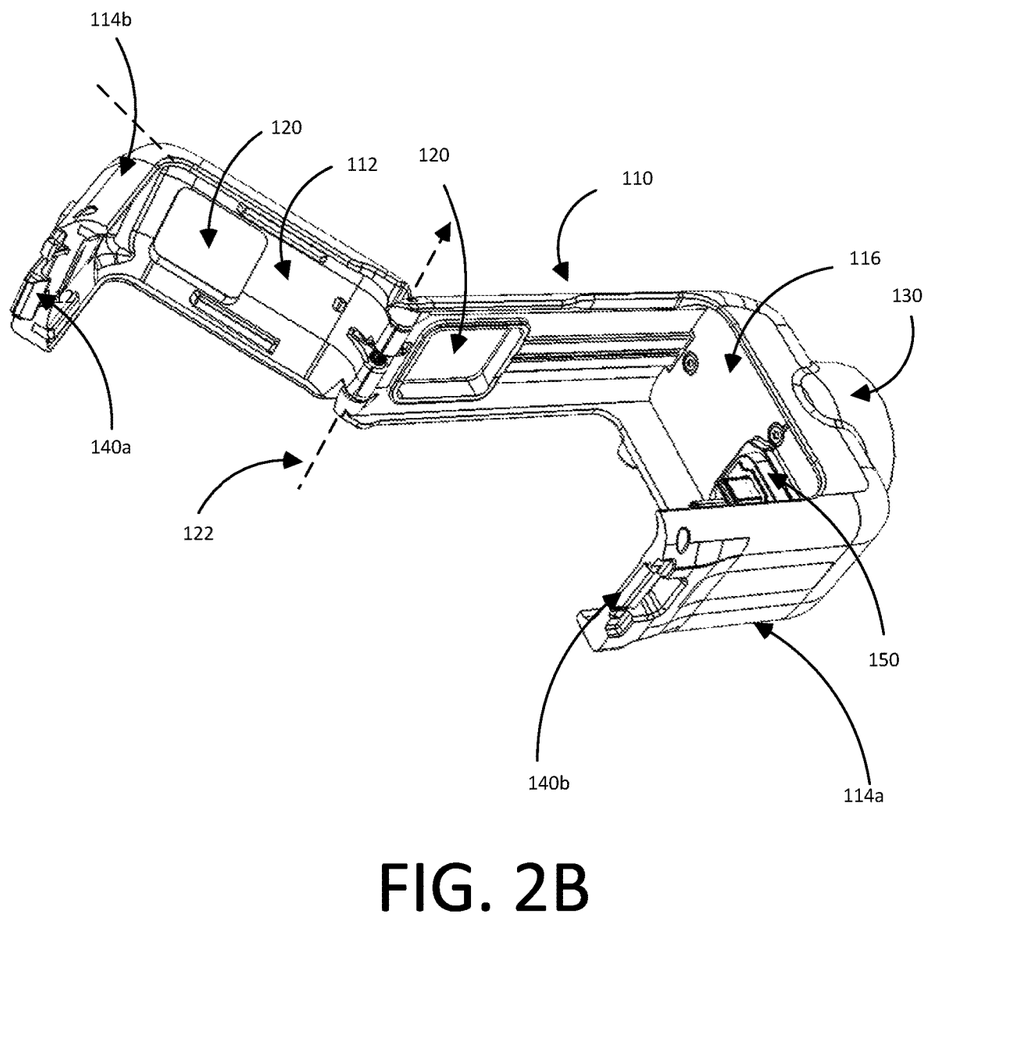
FIG. 2B illustrates an isometric view of the camera frame of FIG. 2A in an open configuration, according to one embodiment.

The camera frame illustrated in FIG. 2B demonstrates an isometric view of the camera frame 100 in the open configuration, according to one embodiment. Similarly to FIG. 1B, the camera frame can comprise a set of four walls 110, 112, 114, 116, a hinge mechanism 120, a button interface 124, a mounting mechanism 130, a latching mechanism 140, and an I/O interface 150. In the illustrated embodiment, the latching mechanism 140 consists of two components, the tongue component 140a and the groove component 140b which separate in the open configuration to allow the hinge mechanism 120 to rotate about the rotation axis 122.

Figure 2C:
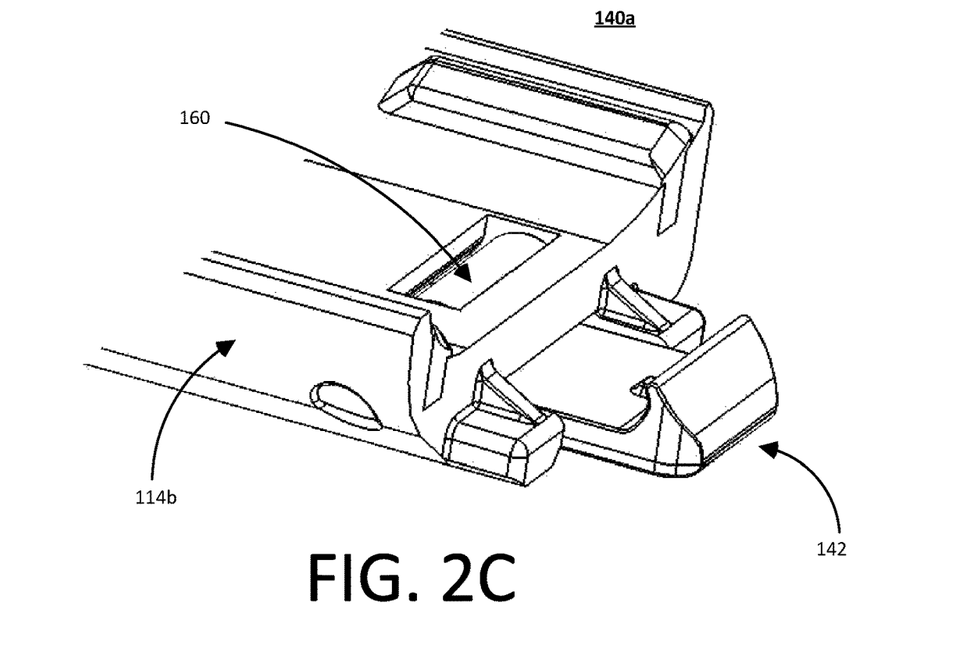
FIG. 2C illustrates the tongue component of the latching mechanism of the camera frame of FIGS. 2A and 2B in the open configuration, according to one embodiment.

FIG. 2C illustrates the tongue component 140a of the latching mechanism 140 of the camera frame 100 in the open configuration, according to one embodiment. The tongue component 140a may couple to the second portion of the bottom wall 114b of the camera frame 100. The tongue component 140a can include a ridge or ledge protrusion 142 extending orthogonally outwards from the second portion of the bottom wall 114b configured to detachably couple to the groove component 140b. In the illustrated embodiment, the tongue component 140a may include a compressible surface 142 on the first portion of the bottom wall that when compressed decouples the tongue component from the groove component as described previously. In other embodiments, the compressible surface may be any other device capable of triggering the release of a latch mechanism such as a screw, a knob, a lever, a switch, a lock, or similar.

Figure 2D:
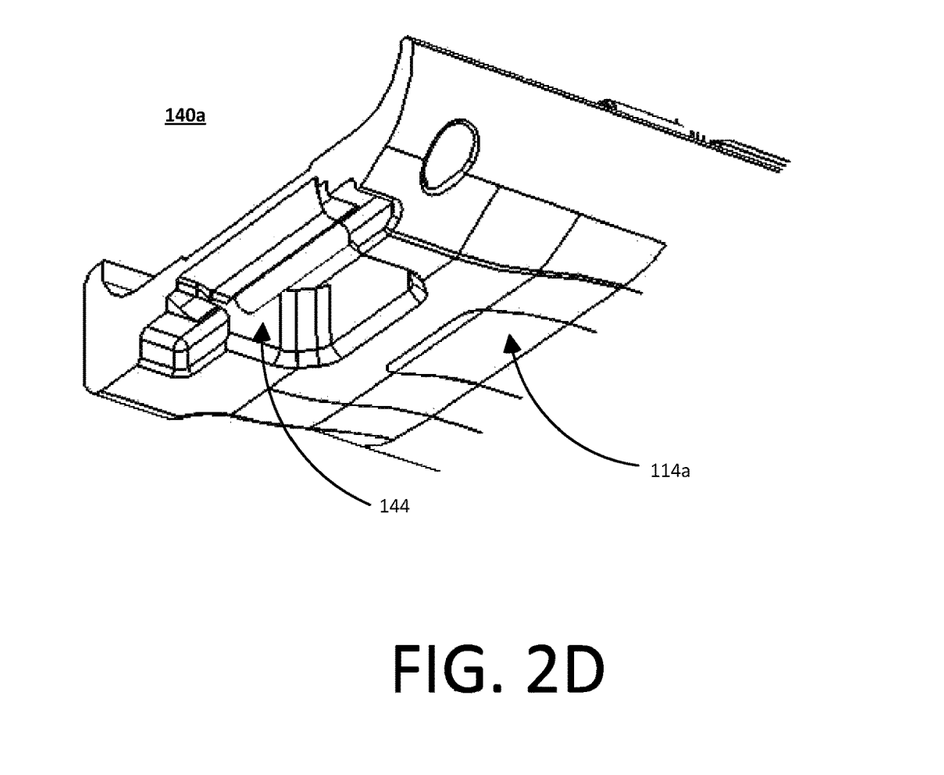
FIG. 2D illustrates the groove component of the latching mechanism of the camera frame of FIGS. 2A and 2B in the open configuration, according to one embodiment.

FIG. 2D illustrates the groove component 140b of the latching mechanism 140 of the camera frame 100 in the open configuration, according to one embodiment. The groove mechanism can couple to the first portion of the bottom wall 114a of the camera frame 100. The groove component includes a reciprocal ledge, ridge, or surface that the tongue mechanism 140a can latch onto such that the first portion of the bottom wall 114a and second portion of the bottom wall are coupled 114b. In the illustrated embodiment, when the tongue and groove components of the latching mechanism are coupled, the outside surface of the first portion of the bottom wall and second portion of the bottom wall are substantially flush.

Figure 2E:
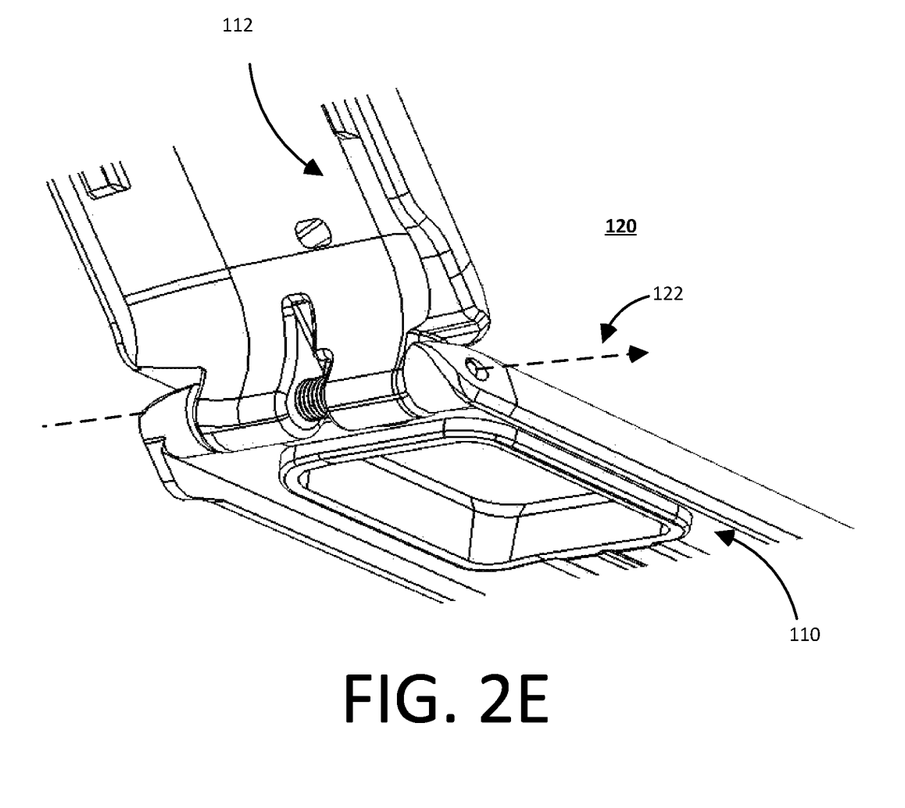
FIG. 2E illustrates a close-up view of the hinge mechanism of the camera frame of FIGS. 1A and 1B in an open configuration, according to one embodiment.

FIG. 2E illustrates a close-up view of the hinge mechanism 120 of the camera frame in the open configuration, according to one embodiment. The hinge mechanism 120 can couple the top wall 110 to the left side wall 112 such that the left side wall and second portion of the bottom side wall (not shown) may rotate about the rotation axis 122.

The rotation of the hinge mechanism from the open configuration (FIG. 1D) to the closed configuration (FIG. 2E) and vice versa can be used to insert and remove a camera from the camera frame. As an example, rotation of the hinge mechanism 120 about the rotation axis 122 may change the angle 124 between the coupled left side wall and second portion of the bottom wall and the top wall by 90 degrees, up to 180 degrees, and greater than 180 degrees. When the left side wall 112 and the second portion of the bottom wall 114b rotate upwards relative to the top wall 110 (for instance, by at least 90 degrees) about the rotation axis 124, a camera can be inserted into the frame from the left side. The coupled left side wall 112 and the second portion of the bottom wall 114b can subsequently be rotated downward, about the rotation axis 124, and the second portion of the bottom wall 114b can be secured to the first portion of the bottom wall 114a via the latching mechanism, 140, thereby securing the camera within the camera frame. 100. When the camera is inserted into the frame, an I/O interface 150 of the camera can couple to the I/O interface of the frame as described above. Likewise, when the camera frame is in the closed configuration, the latching mechanism 140 can be released, and the left side wall 112 and second portion of the bottom wall 114b can be rotated upward about the rotation axis 122 to configure the frame in the open configuration. In the open configuration, the camera can subsequently be removed from the frame.

Figure 3A:
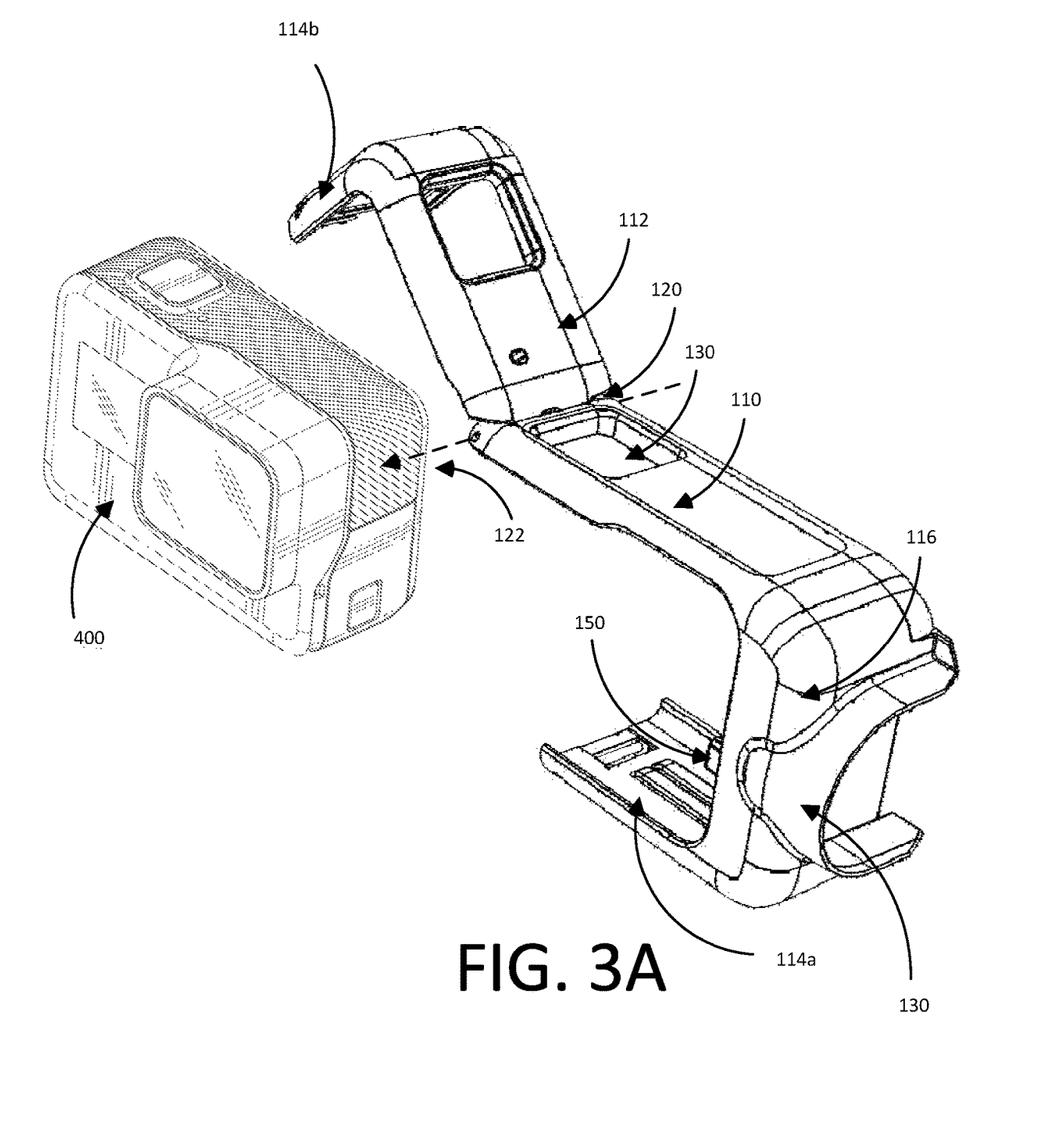
FIG. 3A illustrates the camera frame in an open configuration with a camera aligned to the opening in the frame, according to one embodiment.
Figure 3B:
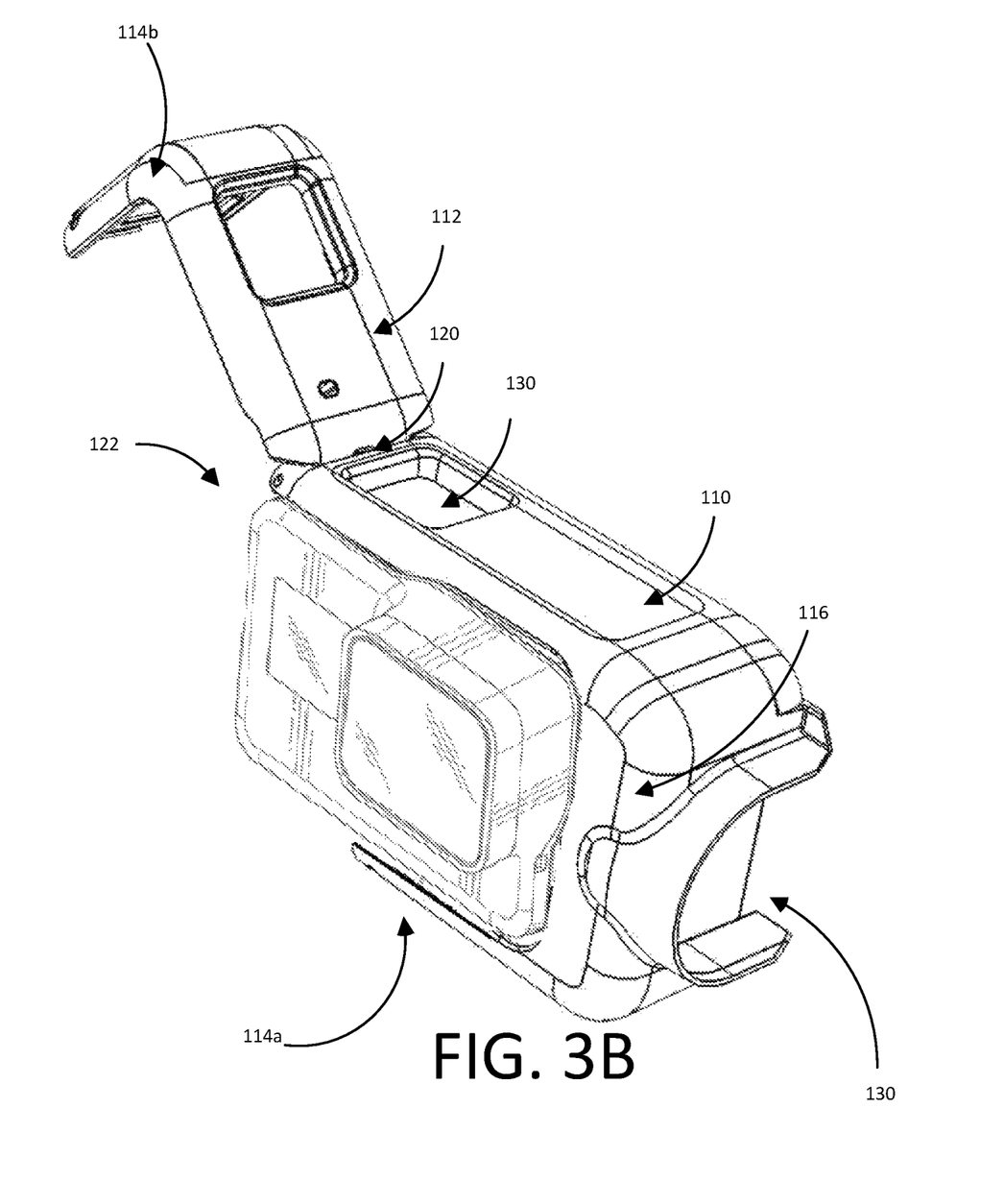
FIG. 3B illustrates the camera frame in an open configuration with a camera inserted into the opening in the frame, according to one embodiment.
Figure 3C:
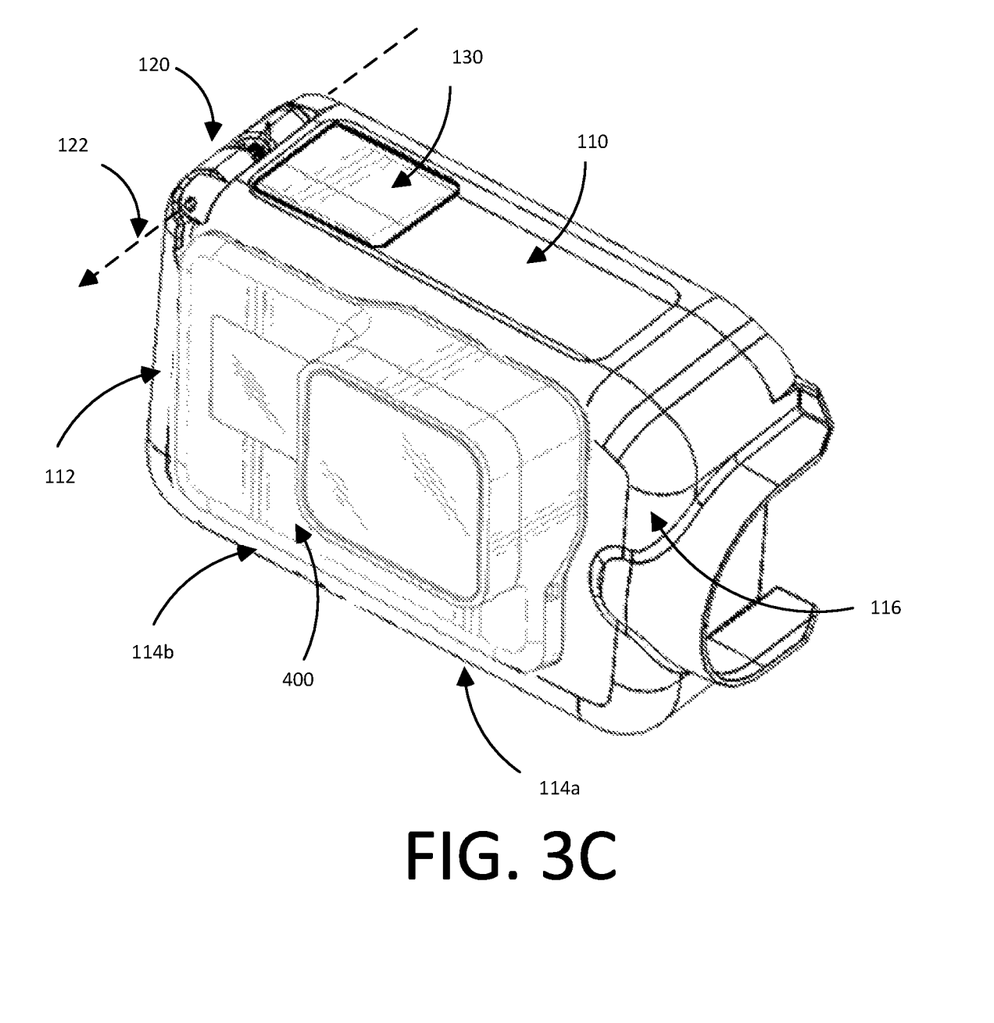
FIG. 3C illustrates the camera frame in a closed configuration with a camera inserted into the frame, according to one embodiment.

FIGS. 3A-3C illustrates the insertion of a camera 400 into the camera frame of 100, according to some embodiments. In FIG. 3A, the left side wall and the second portion of the bottom wall 114b rotate upwards towards the top wall 110 of the frame, about the rotation axis 122 via the hinge mechanism 120, configuring the camera frame in the open configuration. A camera 400 is aligned with the resulting opening in the camera frame 100.

FIG. 3B illustrates the camera 400 is inserted into the opening and into the camera frame 100 in the open configuration similar to FIG. 3A. In the illustrated embodiment, the button interface 124 may be coupled to the camera such that a button on the camera is aligned to and usable via button interface. Additionally, the I/O interface (not shown) may be coupled to the camera such that the I/O components on the camera may be aligned to and usable via the I/O interface of the camera frame.

FIG. 3C illustrates the camera 400 enclosed in the camera frame 100, with the camera frame in the closed configuration. In the illustrated embodiment, the left side wall 112 and the second portion of the bottom 114b wall are rotated downward about the rotation axis 122 via the hinge mechanism 120 such that the latching mechanism (not shown) can secure the second portion of the bottom wall 114b to the first portion of the bottom wall 114a, thereby configuring the frame in the closed configuration.

Note that while FIGS. 3A-3C illustrate the process of inserting a camera into the camera frame, the process of removing a camera from the camera frame follows the process of FIG. 3C, FIG. 3B, then FIG. 3A. To decouple the first portion of the bottom wall from the second portion of the bottom wall the latching mechanism can be released as described previously.

Note that although reference is made herein to the first portion of the bottom wall being coupled to the right side wall and the second portion of the bottom wall being coupled to the left side wall, in practice, the portion of the bottom wall coupled to the left side wall can be referred to as the first portion of the bottom wall and the portion of the bottom wall coupled to the right side wall can be referred to as the second portion of the bottom wall. Furthermore, reference is made herein to the orientation of the camera as illustrated in FIG. 1A, but the directions given in the figure are arbitrary and any wall may be the left side, right side, bottom, or top.

Note that although the frame described and illustrated herein is rectangular in shape, in practice, the frame can be square shaped or can be any other suitable shape. In some embodiments, adjacent walls of the frame are coupled via a rounded corner. In some embodiments, when the camera is securely inserted into the frame, and the frame is configured in the closed configuration, the inside surface of the top wall of the frame abuts the top surface of the camera, the inside surface of the right wall of the frame abuts the right surface of the camera, the inside surface of the left wall of the frame abuts the left surface of the camera, and the inside surface of the bottom wall of the frame abuts the bottom surface of the camera.

In some embodiments, a button or other input interface of the camera aligns with the button interface of the frame. Although the button interface of the frame is illustrated as a hole within the left side wall, in other embodiments, the button interface of the frame can include a digital or physical button or other interface that, when pressed by or interacted with by a user, results in the pressing or interaction of the corresponding button or interface of the camera. In some embodiments, a similar button interface is located on one or more other walls of the frame, such as a top wall, and aligns with one or more button or other interaction interfaces of the camera when the camera is enclosed within the frame. Further, it should be noted that the button interface of the frame can be located within a center of a frame wall, or can be located off-center of the frame wall.

In some embodiments, the hinge spring or other spring-loaded mechanism cause the left side wall and the second portion of the bottom wall to forcibly rotate when the latching mechanism is unlatched (e.g., the left side wall and the second portion of the bottom wall rotate automatically when the latching mechanism is unlatched, without further input from a user). In some embodiments, the hinge mechanism includes a stopper that prevents the left side wall and the second portion of the bottom wall from rotating beyond a threshold rotation. In some embodiments, the hinge spring may be used to control the rate of rotation about the rotation axis.

Example Camera Configuration

Figure 4A:
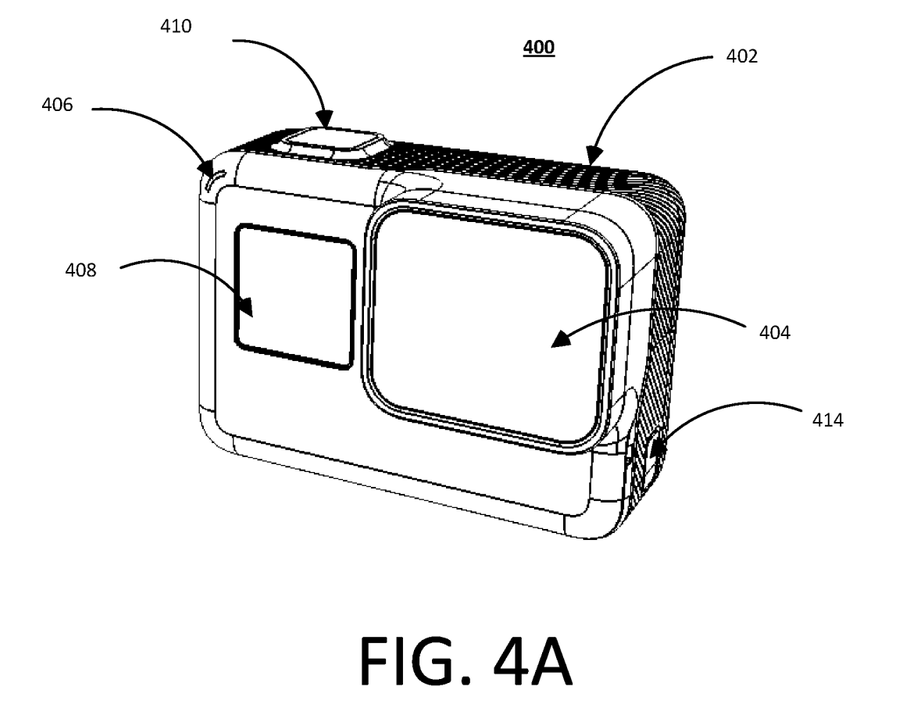
FIG. 4A shows a first isometric view of a camera system that may be inserted into the camera frame according to one embodiment.
Figure 4B:
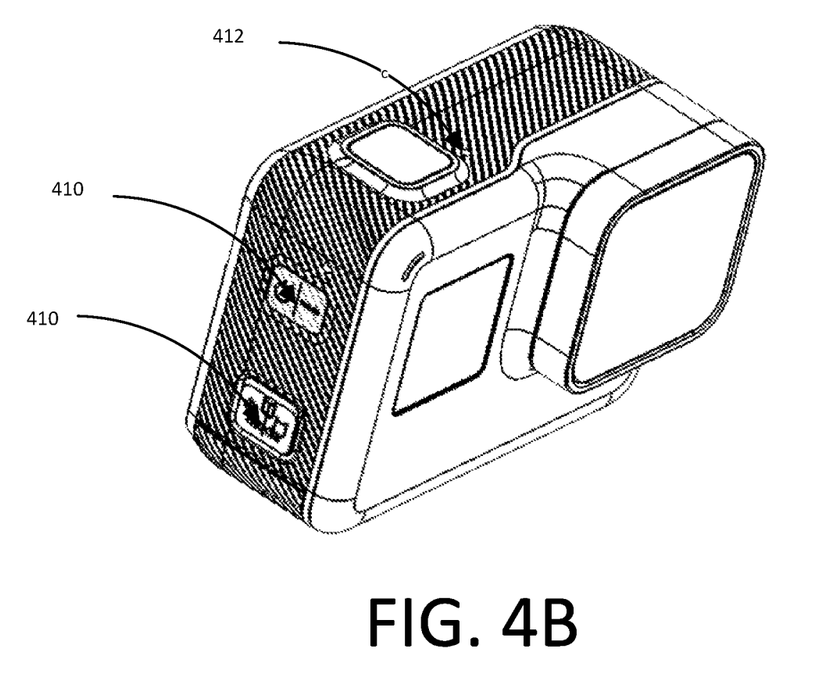
FIG. 4B shows a second isometric view of a camera system that may be inserted into the camera frame according to one embodiment.

Figures (FIGS. 4A-4B illustrate an embodiment of an example camera 400 that may be inserted into and coupled to the camera frame 100. The camera 400 may comprise a camera body 402 having a camera lens 404 structured on a front surface of the camera body, various indicators on the front of the surface of the camera body 402 (such as LEDs, displays, and the like), various input mechanisms (such as buttons, switches, and touch-screen mechanisms), and electronics (e.g., imaging electronics, power electronics, etc.) internal to the camera body 402 for capturing images via the camera lens and/or performing other functions. The camera 400 may be configured to capture images and video, and to store captured images and video for subsequent display or playback.

The camera 400 can include various indicators, including the LED lights 406 and the LED display 408. The camera 400 can also include buttons 410 configured to allow a user of the camera to interact with the camera, to turn the camera on, and to otherwise configure the operating mode of the camera. The camera 400 can also include a microphone 412 configured to receive and record audio signals in conjunction with recording video. The side of the camera 400 may include an I/O interface 414. The camera may also include a loudspeaker (or speaker) 416 system integrated into the camera housing. The front surface of the camera may include two drainage ports as part of a drainage channel 418 for the camera audio system. The camera can include an interactive display that allows for interaction with the camera while simultaneously displaying camera information on a surface of the camera. As illustrated, the camera 400 may include a lens 404 configured to receive light incident upon the lens and to direct received light onto an image sensor internal to the lens.

The camera 400 includes a camera exterior that encompasses and protects the camera's internal electronics, which are further described in later sections. The camera exterior includes 6 surfaces (i.e. a front surface, a left surface, a right surface, a back surface, a top surface, and a bottom surface), wherein the exterior surfaces form a rectangular cuboid. Furthermore, both the front and rear surfaces of the camera 400 are substantially rectangular in shape. The camera 400 can be made of a rigid material such as plastic, aluminum, stainless steel, or fiberglass.

Additional camera features, such as the features described above, may be affixed to an exterior of the camera. In some embodiments, the camera described herein includes features other than those described below. For example, instead of a single interface button, the camera can include additional buttons or different interface features, such as a multiple microphone openings to receive voice or other audio commands.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera housing as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

The invention claimed is:

1. A camera frame comprising:
a housing body comprising walls configured to secure a camera within the housing body, the housing body comprising:
   a left wall, a top wall, a right wall, and a bottom wall; wherein the bottom wall is divided into a first portion and a second portion;
   a forward side that is bounded by the left wall, the top wall, the right wall, and the bottom wall, the forward side being open so that when the camera is inserted into the housing body a lens of the camera is configured to extend outside of the housing body;
a hinge mechanism pivotally coupling the first portion to the second portion so that the first portion is movable relative to the second portion about a rotation axis;
a latching mechanism connected to and extending from the first portion to the second portion so that the first portion and the second portion are coupled together when the latching mechanism is in a closed configuration, and the latching mechanism is configured to secure a camera within the housing body when the latching mechanism is in the closed configuration; and
a microphone interface that is configured to allow sound to pass from outside of the camera frame through a wall of the camera frame and into an interface of an audio system of the camera when the camera is enclosed by the camera frame,
wherein the left wall is movable with the first portion about the rotation axis.

2. The camera frame of claim 1, wherein the latching mechanism comprises a tongue component on the first portion and a groove component on the second portion.

3. The camera frame of claim 2, wherein the tongue component connects with the groove component and moves the first portion and the second portion from an open configuration to the closed configuration as the latching mechanism is rotated about a latching axis.

4. The camera frame of claim 2, wherein the tongue component and the groove component are separated when the camera frame is in an open configuration.

5. The camera frame of claim 4, wherein the tongue component includes a ridge or a ledge protrusion.

6. The camera frame of claim 1, wherein the camera frame includes a mounting mechanism that mounts the camera frame to a gimbal, a handle, or an aerial vehicle.

7. The camera frame of claim 1, comprising a button interface that is configured to allow a user to interact with a button on the camera when the camera is enclosed within the camera frame.

8. A camera frame comprising:
a housing body comprising walls configured to secure a camera within the housing, the housing body comprising:
   a left wall, a top wall, a right wall, and a bottom wall; wherein the bottom wall is divided into a first portion and a second portion;
a hinge mechanism pivotally coupled to the first portion so that the first portion is movable relative to the second portion about a rotation axis; and
a latching mechanism comprising:
   a tongue component on the first portion, the tongue component including a ridge or a ledge protrusion; and
   a groove component on the second portion, the groove component including a reciprocal ledge, ridge, or surface that the tongue component can latch into so that the first portion and the second portion are coupled;
an input/output interface extending on an inside surface of the right wall into an interior of the camera frame so that when the camera is installed within the interior of the camera frame the camera and the camera frame are communicatively coupled via the input/output interface;
a mounting mechanism that mounts the camera frame to a gimbal, a handle, an aerial vehicle, or any other camera mounting device or mechanism; and
a button interface that is configured to allow a user to interact with a button on the camera when the camera is enclosed within the camera frame.

9. The camera frame of claim 8, wherein the latching mechanism is rotatable by an angle of about 90 degrees up to about 180 degrees and the hinge mechanism is located between the left wall and the top wall diagonally opposite the input/output interface.

10. The camera frame of claim 9, wherein the camera frame is substantially rectangular with rounded corners.

11. The camera frame of claim 8, comprising a microphone interface that is configured to allow sound to pass from outside of the camera frame through a wall of the camera frame and to an audio system of a camera when the camera is enclosed by the camera frame.

12. The camera frame of claim 8, wherein a forward side and a rearward side of the housing body are open so that when a camera is installed within the camera frame a front of the camera and a rear of the camera a free of physical obstruction.

13. The camera frame of claim 12, wherein the opening in the forward side is configured to allow a lens of the camera to extend beyond a forward surface of the camera frame.

14. A camera frame comprising:
a housing body comprising walls configured to secure a camera within the housing, the walls comprising:
   a left wall, a top wall, a right wall, and a bottom wall; wherein the bottom wall is divided into a first portion and a second portion, and the housing body is substantially rectangular with rounded corners; and
   the walls are free of a physical joint between the walls as the walls are created from a same piece of material;
a hinge mechanism pivotally coupling the first portion to the second portion so that the first portion is movable relative to the second portion about a rotation axis;
a latching mechanism extending between and connecting the first portion to the second portion when the camera frame is in a closed position; and
a mounting mechanism that mounts the camera frame to a gimbal, a handle, or an aerial vehicle;
wherein a forward side and a rearward side of the housing body are open so that when the camera is installed within the camera frame a front of the camera and a rear of the camera are free of physical obstruction, and the opening in the forward side is configured to allow a lens of the camera to extend beyond a forward surface of the camera frame.

15. The camera frame of claim 14, wherein the latching mechanism comprises a tongue component on the first portion and a groove component on the second portion, and the tongue component connects with the groove component and moves the first portion and the second portion from an open configuration to a closed configuration as the latching mechanism is rotated about a latching axis.

16. The camera frame of claim 15, wherein the tongue component includes a ridge or a ledge protrusion and the tongue component and the groove component are separated when the camera frame is in an open configuration.

17. The camera frame of claim 14, comprising: a button interface that is configured to allow a user to interact with a button on a camera when a camera is enclosed within the camera frame; and a microphone interface that is configured to allows sound to pass from outside of the camera frame through a wall of the camera frame and to an audio system of a camera when the camera is enclosed by the camera frame.

\* \* \* \* \*